(12) United States Patent
Kitagawa et al.

(10) Patent No.: US 11,233,441 B2
(45) Date of Patent: Jan. 25, 2022

(54) ROTATING ELECTRIC MACHINE

(71) Applicant: MITSUBISHI ELECTRIC CORPORATION, Chiyoda-ku (JP)

(72) Inventors: Yutaro Kitagawa, Chiyoda-ku (JP); Yasuhiro Shiraki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/044,499

(22) PCT Filed: Jan. 16, 2019

(86) PCT No.: PCT/JP2019/001091
§ 371 (c)(1),
(2) Date: Oct. 1, 2020

(87) PCT Pub. No.: WO2019/198289
PCT Pub. Date: Oct. 17, 2019

(65) Prior Publication Data
US 2021/0044179 A1    Feb. 11, 2021

(30) Foreign Application Priority Data

Apr. 9, 2018 (JP) ............................. JP2018-074938

(51) Int. Cl.
*H02K 11/02* (2016.01)
*H02K 11/33* (2016.01)
*H02K 1/16* (2006.01)

(52) U.S. Cl.
CPC ............. *H02K 11/02* (2013.01); *H02K 1/165* (2013.01); *H02K 11/33* (2016.01)

(58) Field of Classification Search
CPC ..... H02K 11/0141; H02K 11/02; H02K 11/33
See application file for complete search history.

(56) References Cited

U.S. PATENT DOCUMENTS 7,151,333 B2 * 12/2006 Suzuki .................. H02K 5/225
310/71
7,365,458 B2 * 4/2008 Yoshida ................ H02K 11/40
310/68 R

FOREIGN PATENT DOCUMENTS

| JP | 62-185479 U | 11/1987 |
| JP | 5-32795 U | 4/1993 |
| JP | 5-70149 U | 9/1993 |
| JP | 2001-112197 A | 4/2001 |
| JP | 2004-229429 A | 8/2004 |
| JP | 2008-306833 A | 12/2008 |
| JP | 2013-123278 A | 6/2013 |

OTHER PUBLICATIONS

International Search Report dated Apr. 23, 2019 in PCT/JP2019/001091 filed on Jan. 16, 2019, 2 pages.

\* cited by examiner

*Primary Examiner* — Dang D Le
(74) *Attorney, Agent, or Firm* — Xsensus LLP

(57) ABSTRACT

A motor includes a stator formed by stacking a plurality of core sheets. A plurality of stator windings are wound around a plurality of tooth portions of the stator. A rotor is freely rotatable on an inner peripheral side of the stator. A noise bypass line has one end connected to a core back portion of an outermost core sheet included in the stator and another end grounded to a ground (GND) of a power conversion circuit that drives the motor.

6 Claims, 9 Drawing Sheets

ROTATING ELECTRIC MACHINE

TECHNICAL FIELD

The present invention relates to a rotating electric machine, and more particularly to a rotating electric machine driven by a power conversion circuit including such as an inverter.

BACKGROUND ART

In a rotating electric machine driven by a power conversion circuit including such as an inverter, high-frequency conduction noise is generated due to switching of an element included in the power conversion circuit. When this high-frequency conduction noise leaks to a casing of the rotating electric machine and propagates to a peripheral equipment, an operation of the peripheral equipment may be adversely affected. Therefore, in the rotating electric machine driven by the power conversion circuit, it is required to reduce the leakage of the high-frequency conduction noise to the casing.

In a related-art rotating electric machine, there is known a technology involving additionally providing a shielding portion mounted on a tooth portion of a stator and grounding this shielding portion so as to reduce the high-frequency conduction noise to be propagated to the peripheral equipment (for example, see Patent Literatures 1 and 2).

In Patent Literature 1, there is described a rotating electric machine in which a shielding portion having three-layer structure formed of an insulator, a conductor and an insulator is sandwiched between a coil and a salient pole of a stator. This shielding portion is grounded, and thus the high-frequency conduction noise is reduced.

Further, in Patent Literature 2, there is described a rotating electric machine in which a shielding portion formed by sandwiching a conductor plate between a first insulating layer and a second insulating layer is provided on each side surface of each tooth portion. A coil is wound around each tooth portion so as to sandwich this shielding portion.

CITATION LIST

Patent Literature

[PTL 1] JP S62-185479 A
[PTL 2] JP 2013-123278 A

SUMMARY OF INVENTION

Technical Problem

However, in the inventions described in Patent Literatures 1 and 2, it is required to additionally provide the shielding portion for noise countermeasure to the stator of the rotating electric machine. Therefore, there arises a problem in that a region for winding a stator winding is limited to the shielding portion, and an area in which the stator winding is allowed to be wound is reduced.

The present invention has been made to solve the above-mentioned problem, and has an object to provide a rotating electric machine that allows reduction of high-frequency conduction noise leaking to a casing, without additionally providing a shielding portion.

Solution to Problem

In order to solve the above-mentioned problem, a rotating electric machine according to the present invention is a rotating electric machine driven by a power conversion circuit, the rotating electric machine comprising: a stator formed by stacking a plurality of core sheets, the stator including: a core back portion having an annular shape; and a plurality of tooth portions extending from an inner peripheral side of the core back portion toward a radially inner side; and a noise bypass line having one end connected to the core back portion of an outermost core sheet included in the stator and another end grounded to a GND of the power conversion circuit.

Advantageous Effects of Invention

The rotating electric machine according to the present invention comprises the noise bypass line having one end connected to the core back portion of the outermost core sheet included in the stator and another end grounded to the GND of the power conversion circuit. In this manner, the high-frequency conduction noise leaking to the casing can be reduced without additionally providing a shielding portion.

DESCRIPTION OF EMBODIMENTS

Now, details of embodiments of a rotating electric machine disclosed in the present application are described with reference to the accompanying drawings. It should be noted, however, that the embodiments described below are merely examples, and the present invention is not limited to those embodiments.

First Embodiment

Figure 1:
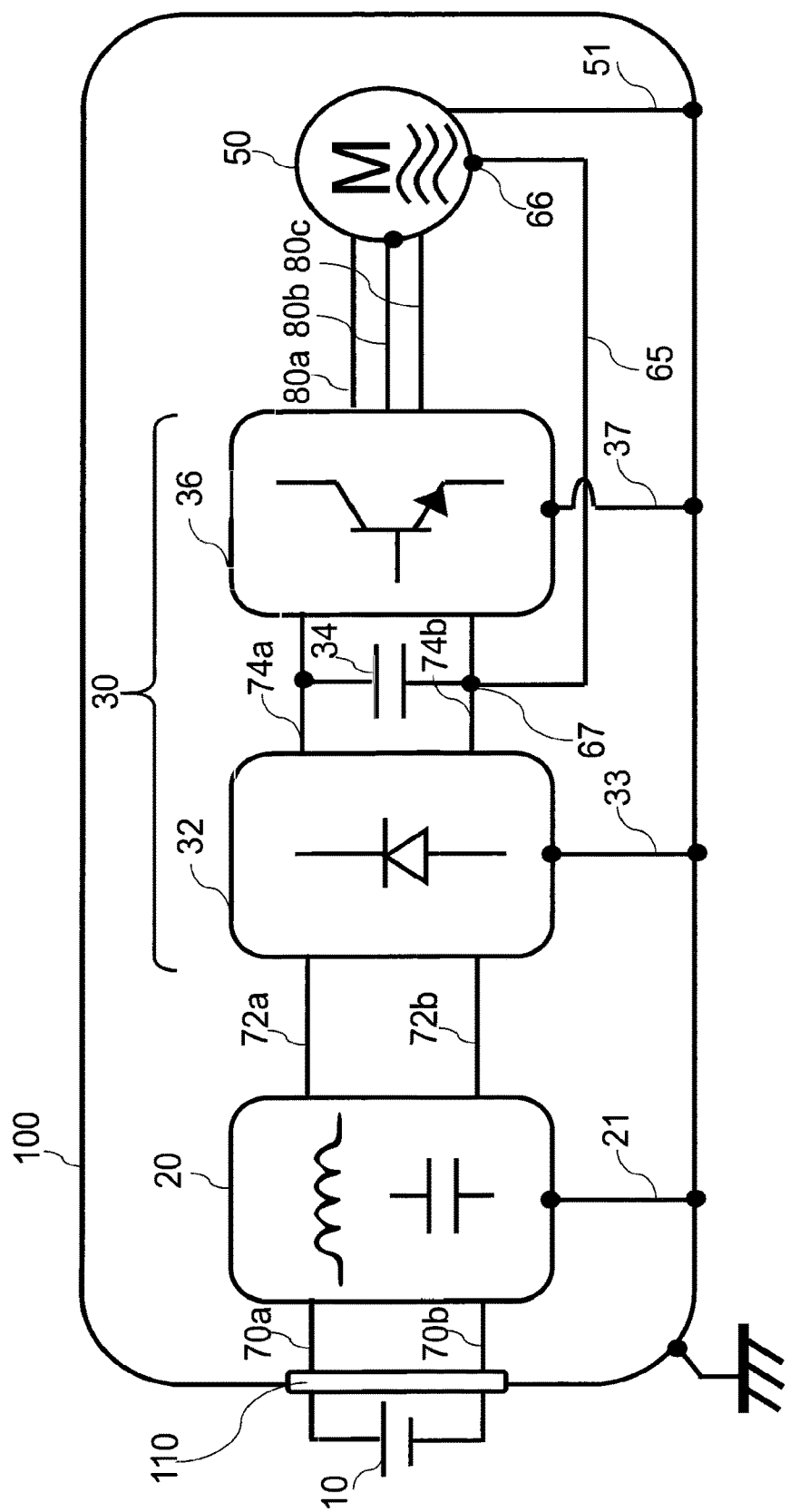
FIG. 1 is a diagram for illustrating configurations of a rotating electric machine according to a first embodiment of the present invention and its surroundings.

FIG. 1 is a diagram for illustrating configurations of a rotating electric machine according to a first embodiment of the present invention and its surroundings. In FIG. 1, a metal casing 100 accommodates a noise filter circuit 20, a power conversion circuit 30 and a motor 50 corresponding to the rotating electric machine. Further, a connector 110 of the casing 100 is connected to a DC power supply 10.

The DC power supply 10 is a battery configured to supply drive power to the motor 50. The DC power supply 10 can include e.g. a lithium-ion battery, a nickel-metal hydride battery or a lead-acid battery.

The noise filter circuit 20 is configured to suppress the high-frequency conduction noise included in the DC power supplied from the DC power supply 10. The DC power supply 10 and the noise filter circuit 20 are connected via DC power lines 70a and 70b. The DC power line 70a is connected to the positive electrode of the DC power supply 10. The DC power line 70b is connected to the negative electrode of the DC power supply 10. Further, the GND of the noise filter circuit 20 is connected to the casing 100 via a ground line 21.

The noise filter circuit 20 comprises a inductor and a capacitor. The noise filter circuit 20 may be implemented on a substrate independent from the power conversion circuit 30 to be described next, or may be implemented on the same substrate as that of the power conversion circuit 30.

The inductor of the noise filter circuit 20 is connected in series to the DC power line 70a. Since inductor serves as a high impedance with respect to high-frequency conduction noise, the inductor suppresses the high-frequency conduction noise from the DC power supply 10. For example, a coil formed by winding a winding around a ferrite or other magnetic material can be used as the inductor.

The capacitor of the noise filter circuit 20 is connected in parallel to the DC power line 70a and the DC power line 70b. Since capacitor serves as a low impedance with respect to high-frequency conduction noise, the capacitor bypasses the high-frequency conduction noise from the DC power supply 10 to the GND. For example, a ceramic capacitor can be used as the capacitor.

The power conversion circuit 30 is configured to convert the DC power supplied from the DC power supply 10 through the noise filter circuit 20 into AC power. The power conversion circuit 30 comprises a converter circuit 32, a smoothing capacitor 34 and an inverter circuit 36.

The converter circuit 32 is configured to step-up or step-down the DC voltage output from the noise filter circuit 20 to a predetermined DC voltage. The noise filter circuit 20 and the converter circuit 32 are connected via DC power lines 72a and 72b. Further, the GND of the converter circuit 32 is connected to the casing 100 via a ground line 33.

The converter circuit 32 comprises e.g. a switching element, a choke coil, a capacitor and a diode. For example, an IGBT or a MOSFET can be used as the switching element. The converter circuit 32 is configured to step-up or step-down the DC voltage output from the noise filter circuit 20 to a predetermined DC voltage based on a time ratio between ON time and OFF time of the switching element.

The inverter circuit 36 is configured to convert the DC power output from the converter circuit 32 into three-phase AC power using PWM control. The converter circuit 32 and the inverter circuit 36 are connected via DC power lines 74a and 74b. Further, the GND of the inverter circuit 36 is connected to the casing 100 via a ground line 37.

The inverter circuit 36 comprises e.g. a switching element and a diode. For example, an IGBT or a MOSFET can be used as the switching element.

The smoothing capacitor 34 is connected in parallel to the DC power line 74a and the DC power line 74b in order to suppress AC components, i.e. ripples, superimposed on the DC power stepped-up by the converter circuit 32. For example, an electrolytic capacitor can be used as the smoothing capacitor 34.

The motor 50 is configured to generate a rotating drive force by the three-phase AC power supplied from the inverter circuit 36. The inverter circuit 36 and the motor 50 are connected via AC power lines 80a to 80c. Further, the GND of the motor 50 is connected to the casing 100 via a ground line 51.

The casing 100 accommodates the noise filter circuit 20, the power conversion circuit 30, the motor 50, the DC power lines 70a, 70b, 72a, 72b, 74a and 74b, and the AC power lines 80a to 80c. The casing 100 is made of steel, aluminum or other conductive metals. The casing 100 functions as an electromagnetic noise shield for preventing entry of electromagnetic wave from the outside and preventing leakage of electromagnetic wave generated inside of the casing 100 to the outside. Further, the casing 100 functions as a common GND shared by the noise filter circuit 20, the power conversion circuit 30 and the motor 50.

Hereinafter, a detailed configuration of the motor 50 corresponding to the rotating electric machine according to the first embodiment is described.

Figure 2:
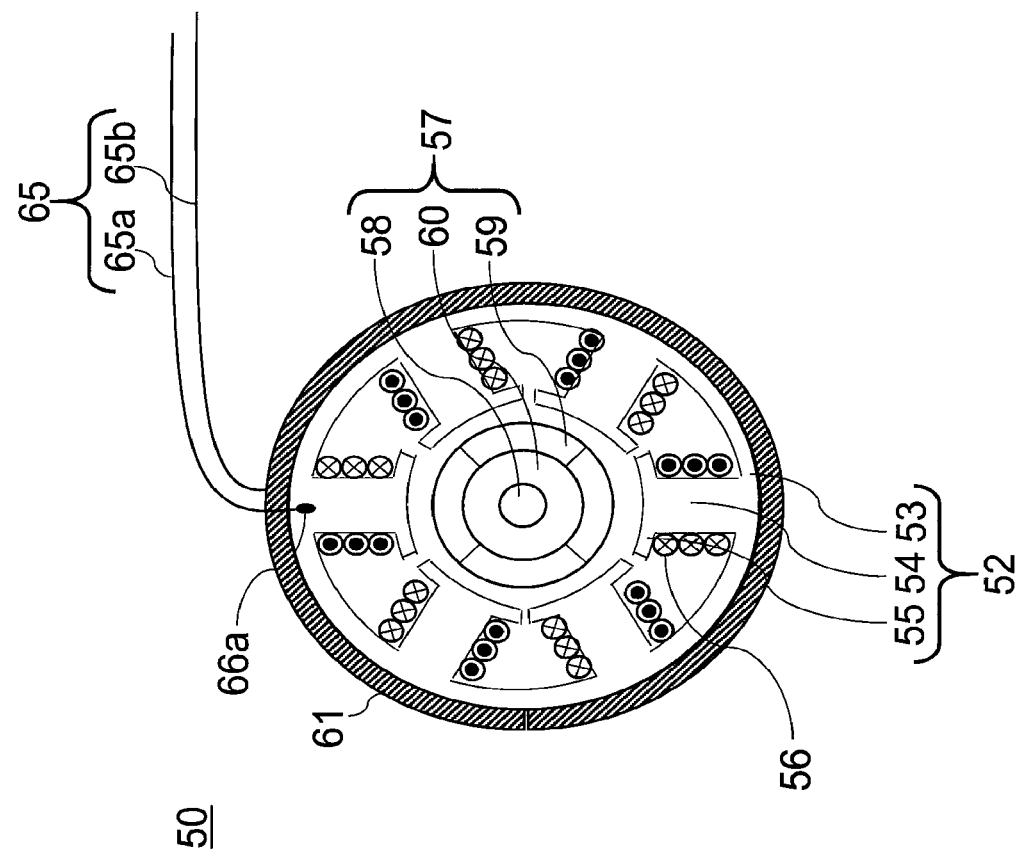
FIG. 2 is a schematic view for illustrating a main part of a motor according to the first embodiment.

FIG. 2 is a schematic view for illustrating a main part of the motor 50 according to the first embodiment. The motor 50 is a general brushless motor, and it comprises a stator 52, stator windings 56, a rotor 57 and a housing 61.

Figure 3:
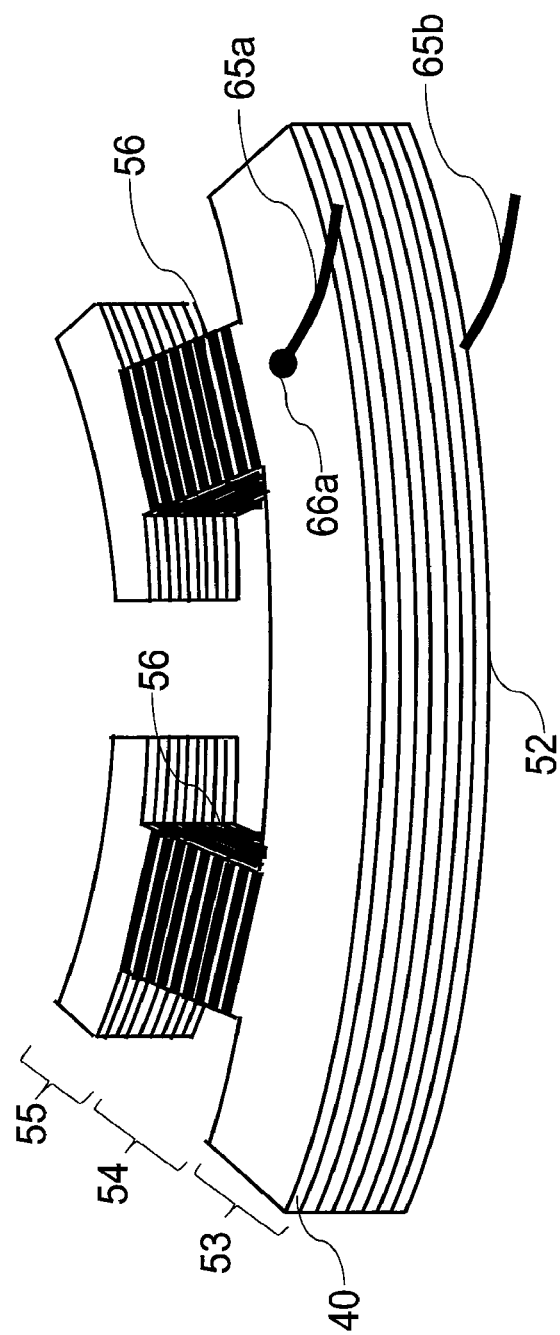
FIG. 3 is a perspective view for illustrating a stator in the first embodiment.

FIG. 3 is a perspective view of the stator 52. As illustrated in FIG. 3, the stator 52 is formed by stacking a plurality of core sheets 40 along the direction of the rotational axis. Each of the core sheets 40 is formed by covering electromagnetic steel or other magnetic materials with an insulating coating film. The stacked core sheets 40 are fastened to each other by caulking, welding, using bolts, or other methods.

The stator 52 includes a core back portion 53 having an annular shape, tooth portions 54 extending from an inner peripheral side of the core back portion 53 toward a radially inner side and flange portions 55 protruding from leading ends of the tooth portions 54 in a circumferential direction.

Each of the stator windings 56 is wound around each tooth portion 54 of the stator 52. FIG. 2 and FIG. 3 are illustrations of a winding method in which one stator winding 56 is wound around one tooth portion 54. This winding method is generally called Concentrated Winding. However, even when a winding method generally called Distributed Winding is used, the same effects as that of this embodiment to be described later can be obtained.

Three-phase AC currents supplied from the inverter circuit 36 via the AC power lines 80a to 80c flow through the stator windings 56. Magnetic fluxes induced within the respective tooth portions 54 by the three-phase AC currents flowing through the stator windings 56 form one magnetic circuit via the core back portion 53, and thus a rotating magnetic field is generated.

Referring back to FIG. 2, the rotor 57 is arranged so as to be freely rotatable in a space surrounded by the flange portions 55 provided on the inner peripheral side of the stator 52. The rotor 57 includes a drive shaft 58, permanent magnets 59 and a structure 60 configured to hold the drive shaft 58 and the permanent magnets 59. As to the rotor 57 illustrated in FIG. 2, the permanent magnets 59 are embedded inside the rotor 57, instead the permanent magnets 59 may be mounted on the surface of the rotor 57.

When the three-phase AC currents flow through the stator windings 56 and the rotating magnetic field is generated by the above-mentioned principle, the permanent magnets 59 in the rotor 57 receive an electromagnetic force induced by the rotating magnetic field. Thus, the rotor 57 is rotated. The drive force generated by the rotation of the rotor 57 can be extracted to the outside of the casing 100 through the drive shaft 58.

The housing 61 is positioned on an outer peripheral side of the stator 52 so as to fix the stator 52. The stator 52 and the housing 61 are fixed to each other by press-fitting or shrink-fitting.

Further, in the first embodiment, one end of a noise bypass line 65 is connected to the stator 52 of the motor 50. The noise bypass line 65 is formed of a metal conductive wire. Specifically, the noise bypass line 65 can be formed of e.g. a copper wire covered with an enamel coating film. As other methods of forming the noise bypass line 65, it is also possible to use a planar copper plate i.e. a bus bar, or wiring obtained by twisting a plurality of copper wires i.e. a litz wire.

Figure 4:
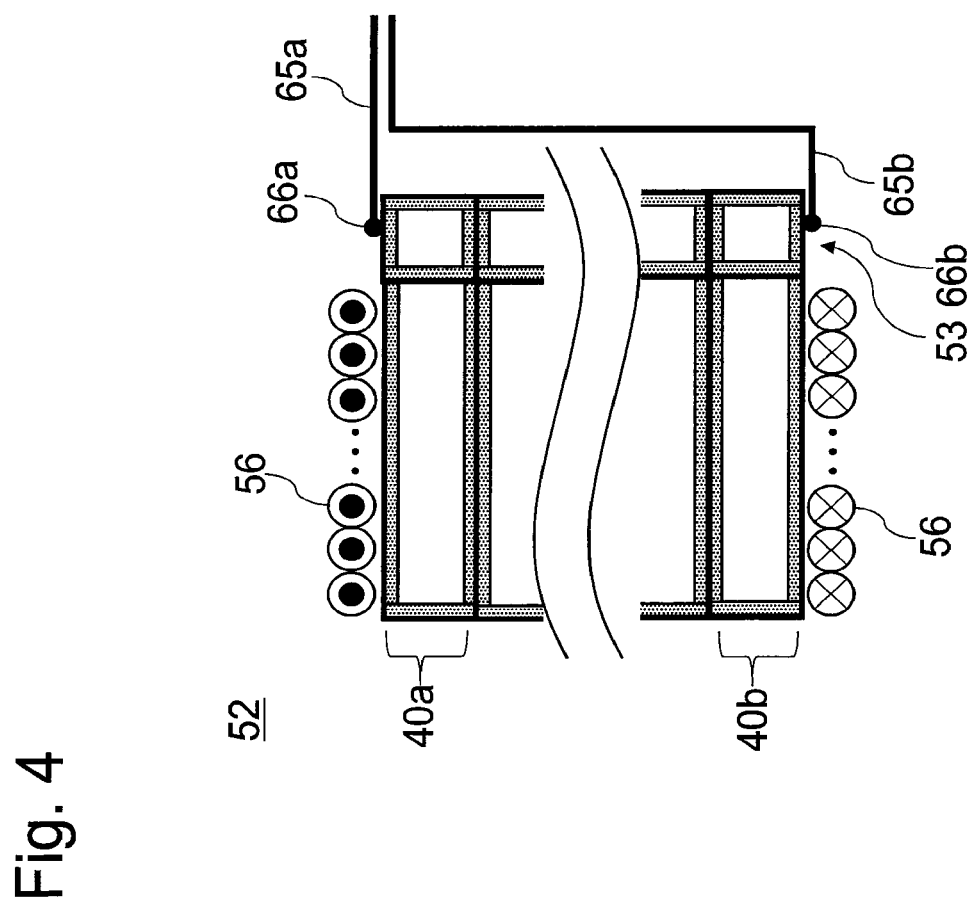
FIG. 4 is a sectional view of the stator in the first embodiment.

As illustrated in FIG. 4, in the first embodiment, a first noise bypass line 65*a* is connected at one point to the core back portion 53 of the outermost core sheet 40*a* which forms one side of the stator 52. Further, a second noise bypass line 65*b* is connected at one point to the core back portion 53 of the outermost core sheet 40*b* which forms another side of the stator 52. As a method of connecting one end 66*a* of the noise bypass line 65*a* and one end 66*b* of the noise bypass line 65*b* to the core back portion 53 of the stator 52, there may be employed soldering or fastening to the core back portion 53 by caulking.

Further, as illustrated in FIG. 1, another end of the noise bypass line 65 is connected to a node 67 of the GND side of the smoothing capacitor 34.

Hereinafter, advantageous effects of the rotating electric machine according to the first embodiment, specifically an effect of reducing the high-frequency conduction noise leaking from the stator 52 of the motor 50 to the casing 100, are described.

First, Electromagnetic Compatibility (EMC) Standards is explained while taking an example of conduction noise, which is one of subjects to be regulated.

As a conduction noise standard test, there is known an evaluation method using a line impedance stabilization network, i.e. LISN.

The LISN keeps constant an impedance of a power supply viewed from an equipment to be tested, and it comprises an external output terminal for measuring a generation amount of power line conduction noise, i.e. a noise terminal voltage. When this external output terminal is connected to a measurement equipment e.g. a receiver or a spectrum analyzer, the noise terminal voltage at each frequency can be evaluated. Meeting the EMC Standards means that the noise terminal voltage measured at the external output terminal of the LISN falls below a limit value defined in the EMC Standards. In order to bring an equipment incorporating a motor to the market, the equipment is required to meet such EMC Standards.

Figure 5:
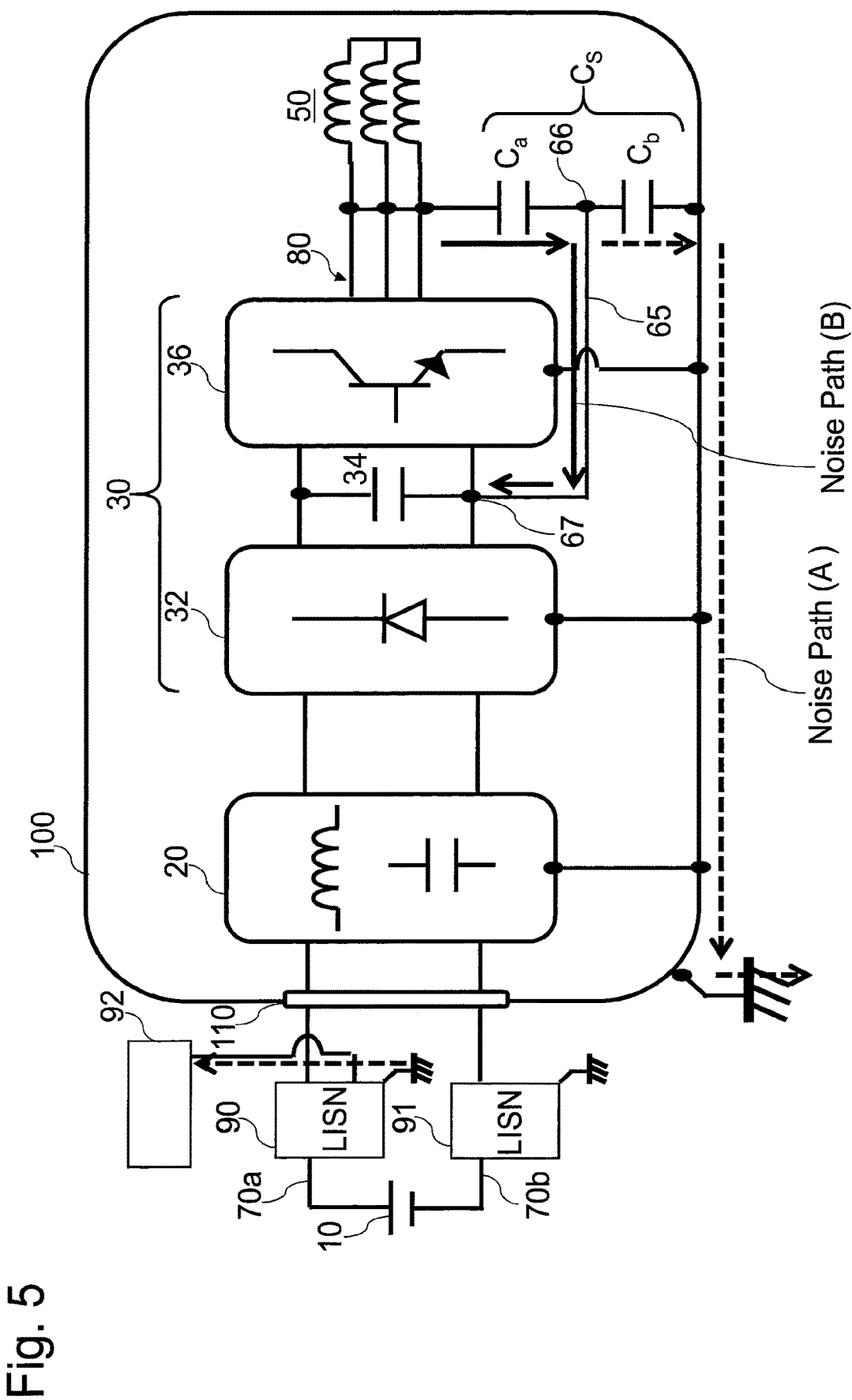
FIG. 5 is a diagram for illustrating noise paths in the first embodiment.

FIG. 5 is an explanatory diagram for illustrating locations at which the LISNs are installed in the first embodiment. As illustrated in FIG. 5, an LISN 90 is connected to the DC power line 70*a* between the positive electrode of the DC power supply 10 and the connector 110 of the casing 100. Further, an LISN 91 is connected to the DC power line 70*b* between the negative electrode of the DC power supply 10 and the connector 110 of the casing 100. Each of the LISNs 90 and 91 is grounded to the same GND as that of the casing 100.

When the motor 50 is driven, the high-frequency conduction noise generated by the switching operations of the switching elements included in the converter circuit 32 and the inverter circuit 36 is superimposed on the three-phase AC currents flowing through the stator windings 56 of the motor 50. This high-frequency conduction noise flows from the stator windings 56 to the stator 52 via a floating capacitor Cs formed between the stator 52 and the stator windings 56.

In this case, if the noise bypass line 65*s* are absent, the high-frequency conduction noise flowing into the stator 52 entirely leaks to the casing 100 via the housing 61 of the motor 50. The high-frequency conduction noise leaking to the casing 100 flows along a noise path (A) indicated by the broken line in FIG. 5, and flows into the LISN 90 via the GND of the casing 100. The high-frequency conduction noise is detected as a noise terminal voltage by a noise measurement equipment 92.

In order to reduce the noise terminal voltage so as to meet the EMC Standards as described above, it is required to reduce the leakage of the high-frequency conduction noise to the casing 100.

Hereinafter, advantageous effects obtained by the presence of the noise bypass line 65 in the first embodiment are described. As described earlier with reference to FIG. 4, the one end 66*a* of the first noise bypass line 65*a* is connected at one point to the core back portion 53 of the outermost core sheet 40*a* among the stacked core sheets 40 forming the stator 52. Further, the one end 66*b* of the second noise bypass line 65*b* is connected at one point to the core back portion 53 of the outermost core sheet 40*b* among the stacked core sheets 40 forming the stator 52.

The core sheets 40*a* and 40*b* are outermost core sheets among the stacked core sheets 40 forming the stator 52, and thus they are core sheets closest to the stator windings 56. Further, the core sheets 40*a* and 40*b* have widest opposing areas with respect to the stator windings 56 as compared to other core sheets.

In view of those facts, a floating capacitor Ca between the core sheets 40*a* and 40*b* and the stator windings 56 has a larger capacitance than a floating capacitor Cb between the other core sheets and the stator windings 56.

As is well known, as for high-frequency conduction noise, a large floating capacitance means a low impedance. Therefore, a larger amount of high-frequency conduction noise is liable to flow through the core sheets 40*a* and 40*b* as compared to the other core sheets.

Therefore, when the core sheet 40*a* is connected at one point to the one end 66*a* of the noise bypass line 65*a* and the core sheet 40*b* is connected at one point to the one end 66*b* of the noise bypass line 65*b*, which means that a sufficiently low impedance is established, the high-frequency conduction noise superimposed on the stator windings 56 is bypassed to the noise bypass lines 65*a* and 65*b* and flows along a noise path (B) indicated by the solid line in FIG. 5.

The other end of the noise bypass line 65 is connected to the node 67 on the GND side of the smoothing capacitor 34. Therefore, the high-frequency conduction noise bypassed to the noise bypass line 65 is returned to the GND side of the smoothing capacitor 34. That is, the high-frequency conduction noise generated in the converter circuit 32 and the inverter circuit 36 is returned to the GND side of the smoothing capacitor 34 by providing the noise bypass line 65. In this manner, the high-frequency conduction noise leaking to the casing 100 via the stator 52 to be detected by the noise measurement equipment 92 is reduced.

Figure 6:
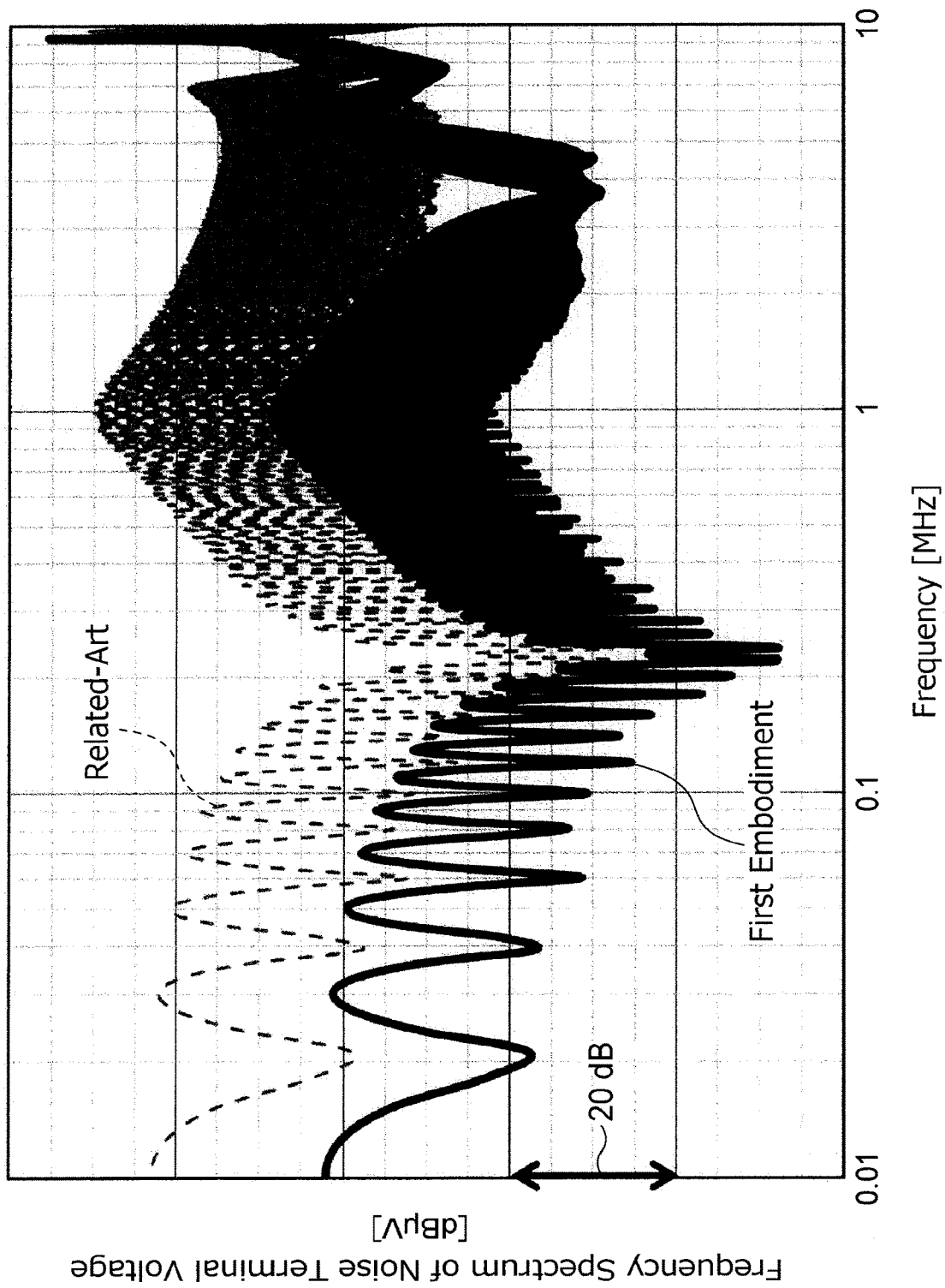
FIG. 6 is a graph for showing a simulation result in the first embodiment.

FIG. 6 shows a simulation result for investigating the above-mentioned effect. In FIG. 6, a frequency spectrum of the noise terminal voltage detected at the external output terminal of the LISN 90 connected to the positive electrode of the DC power supply 10 is represented in a range of from 0.01 MHz to 10 MHz. As is understood from FIG. 6, in the first embodiment, as compared to the related-art example, the frequency spectrum of the noise terminal voltage observed at the LISN 90 is reduced by about 20 dB in the range of from 0.01 MHz to 10 MHz. This means that the noise terminal voltage detected at the external output terminal of the LISN 90 is reduced to about ⅒. That is, with the configuration of the rotating electric machine according to the first embodiment, the high-frequency conduction noise leaking to the casing 100 can be effectively reduced without additionally providing a shielding portion for noise countermeasure to the stator 52. In this manner, the capacitor, the inductor, or other noise countermeasure components included in the noise filter circuit 20 can be downsized or omitted.

In the configurations described in Patent Literatures 1 and 2 as the related-art example, for the purpose of reducing the high-frequency conduction noise, the shielding portion is mounted on the tooth portion of the stator. However, such a configuration has a problem in that an area in which a winding is allowed to be wound in the tooth portion is reduced. Therefore, in order to obtain motor output equivalent to that in a case in which no shielding portion is mounted, it is required to reduce the wire diameter of the winding to achieve the same number of turns, or to upsize the tooth portion while keeping the same wire diameter of the winding.

However, when the wire diameter of the winding is reduced, copper loss is increased due to winding resistance, and thus a voltage drop occurs. This voltage drop reduces the motor output. Further, when the tooth portion is upsized while keeping the same wire diameter, the entire motor may be upsized.

In contrast, in the configuration of the first embodiment, the noise bypass line 65 is connected to the core back portion 53, and hence the area in which the winding is allowed to be wound in the tooth portion is not reduced. Therefore, reduction in output of the motor 50 and upsizing of the motor 50 can be avoided.

As described above, the rotating electric machine according to the first embodiment comprises the noise bypass line which has one end connected to the core back portion of the outermost core sheet included in the stator and another end grounded to the GND of the power conversion circuit. In this manner, the high-frequency conduction noise leaking to the casing can be reduced without additionally providing a shielding portion.

Second Embodiment

Figure 7:
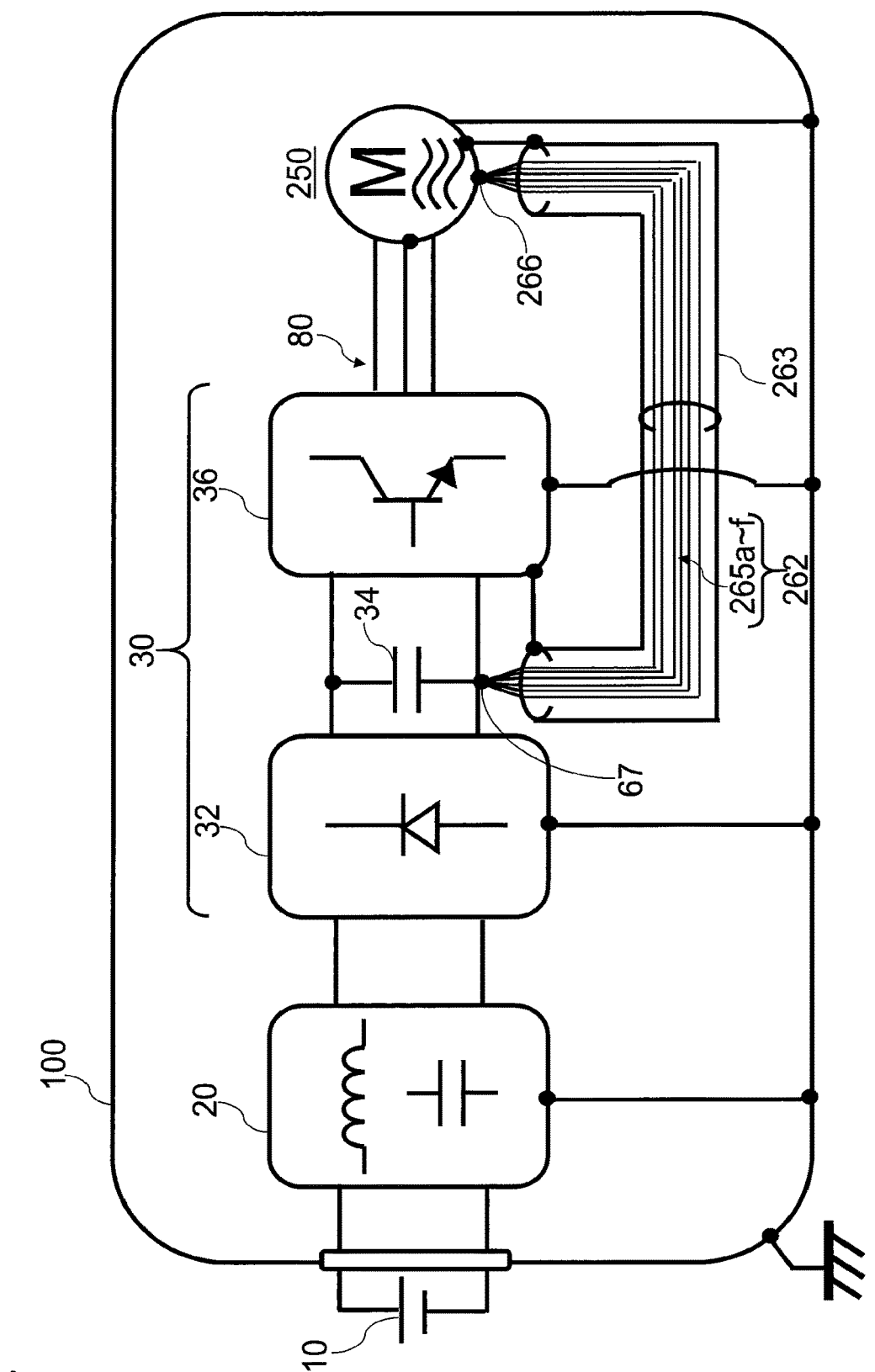
FIG. 7 is a diagram for illustrating configurations of a rotating electric machine according to a second embodiment of the present invention and its surroundings.

FIG. 7 is a diagram for illustrating configurations of a rotating electric machine according to a second embodiment of the present invention and its surroundings. In the second embodiment, a plurality of noise bypass lines 265a to 265f are bundled to form a noise bypass line group 262.

One end of the noise bypass line group 262 is connected at a plurality of points to the core back portion 53 included in the stator 52 of a motor 250. Specifically, as illustrated in FIG. 8, one ends 266a to 266f of the plurality of noise bypass lines 265a to 265f forming the first noise bypass line group 262 are connected at a plurality of points to the core back portion 53 of the outermost core sheet forming one side of the stator 52.

Figure 8:
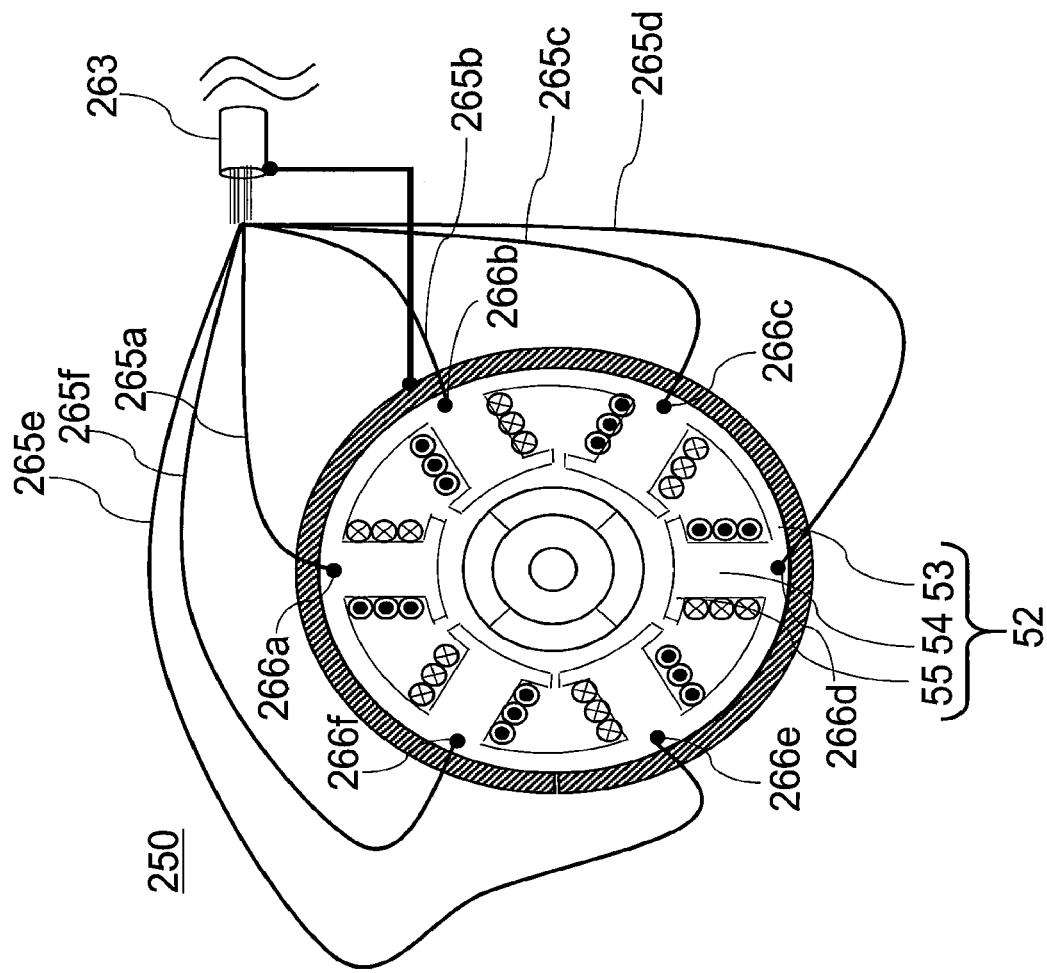
FIG. 8 is a schematic view for illustrating a main part of a motor according to the second embodiment.

For the sake of easy understanding, in FIG. 8, there is only illustrated the first noise bypass line group 262 connected at a plurality of points to the core back portion 53 of the outermost core sheet on one side. However in actuality, a second noise bypass line group is similarly provided and is connected at a plurality of points to the core back portion 53 of the outermost core sheet on another side.

Further, as illustrated in FIG. 7, as similar to the first embodiment, another end of the noise bypass line group 262 is connected to the node 67 on the GND side of the smoothing capacitor 34. In this manner, the high-frequency conduction noise flowing into the outermost core sheet via the floating capacitor formed between the stator and the stator windings of the motor 250 can be bypassed to the node 67 on the GND side of the smoothing capacitor 34.

In particular, it is preferred that the noise bypass lines 265a to 265f forming the noise bypass line group 262 have equal lengths so that the noise bypass lines 265a to 265f have the same impedance. When the noise bypass lines 265a to 265f are connected in parallel, the combined parasitic inductances of the noise bypass lines 265a to 265f can be reduced. As a result, a larger amount of high-frequency conduction noise can be returned to the node 67 on the GND side of the smoothing capacitor 34.

Further, as illustrated in FIG. 7 and FIG. 8, the noise bypass line group 262 is covered by a shielding coating 263. When the noise bypass line group 262 is covered by the shielding coating 263, radiated noise from the noise bypass line group 262 can be reduced. The shielding coating 263 can be formed of e.g. a metal braided wire. Both ends of the shielding coating 263 may be or not be grounded to the GND.

When both the ends of the shielding coating 263 are grounded to the GND, one end of the shielding coating 263 can be connected to the motor 250 and another end thereof can be connected to a heat sink (not shown) of the inverter circuit 36. Further, when both the ends of the shielding coating 263 are grounded to the GND, it is preferred to ground with a low impedance using a jig for a connector, e.g. a so-called SKINTOP.

When it is difficult to use a jig, the braided wire at the end portion may be twisted to be soldered or fastened by a screw instead. At this time, in order to reduce the parasitic inductance, it is preferred to reduce the length of the twisted part as much as possible so that the grounding can be achieved in the shortest path from the end portion of the shielding coating 263 to an installation location.

Further, in the first and second embodiments, the power conversion circuit 30 comprises the converter circuit 32 and the inverter circuit 36. However, the power conversion circuit 30 may comprises only the inverter circuit 36. In this case, the ground point can be set to the GND of the inverter circuit 36, for example the heat sink (not shown) of the inverter circuit 36.

In the first and second embodiments, when the one end of each of the noise bypass line 65 and 265a to 265f is connected to the core back portion 53 of the stator 52, the one end may be connected to a position of the core back portion 53 that allows each of the noise bypass lines 65 and 265a to 265f to have the shortest length. In this manner, the parasitic inductance of each of the noise bypass lines 65 and 265a to 265f can be minimized. As a result, a larger amount of high-frequency conduction noise can be flowed through the noise bypass lines 65 and 265a to 265f.

Further, the other end of each of the noise bypass lines 65 and 265a to 265f may be guided to the smoothing capacitor 34 along the AC power line 80. In this manner, magnetic fluxes generated by the high-frequency conduction noise can be canceled out, and hence radiated noise is reduced.

Further, in the first and second embodiments, the other end of each of the noise bypass lines 65 and 265a to 265f is connected to the GND side of the smoothing capacitor 34. However, the present invention is not limited thereto. For example, the other end of each of the noise bypass lines 65 and 265a to 265f may be connected to a GND side of a line-to-ground capacitor (Y capacitor) included in the noise filter circuit 20.

Figure 9:
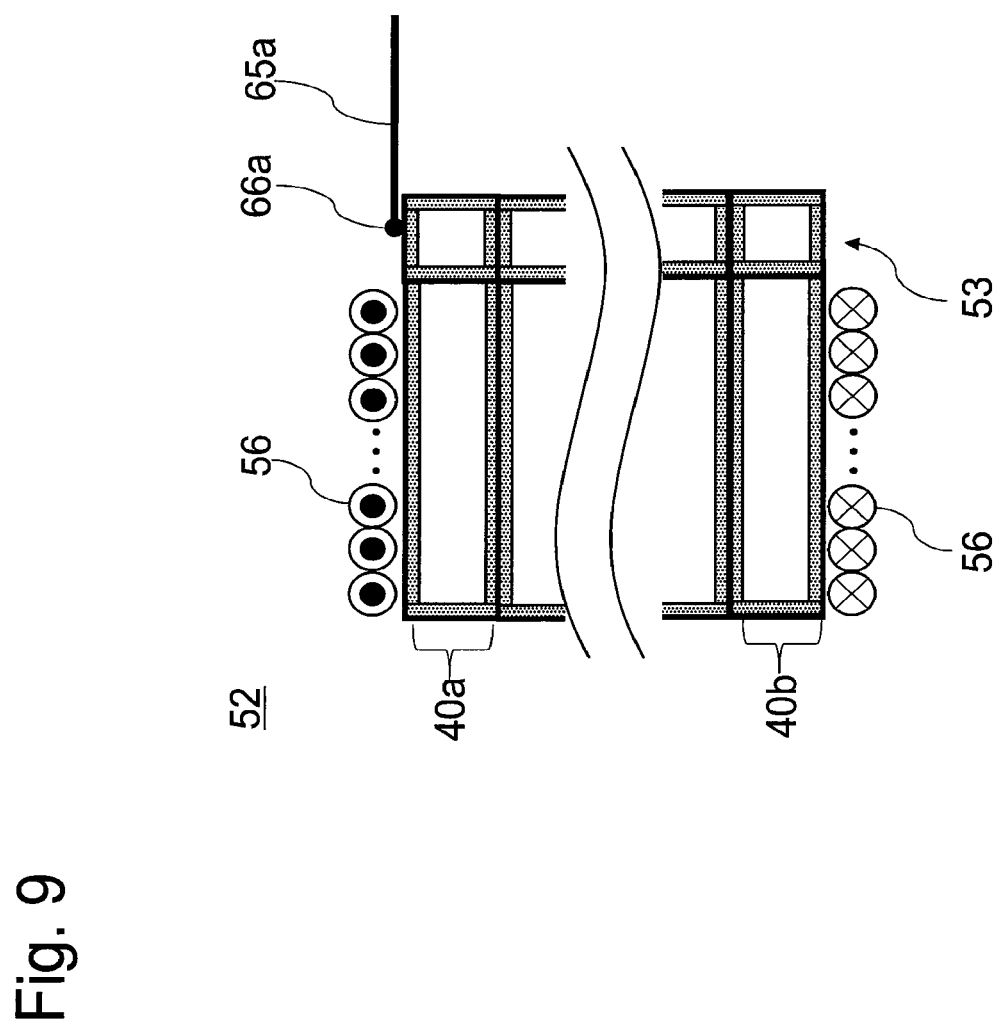
FIG. 9 is a sectional view of a stator in another embodiment of the present invention.

Further, in the first and second embodiments, as illustrated in FIG. 9, the noise bypass lines 65 and 265a to 265f may be connected only to the outermost core sheet on any one side of the stator. In this manner, the number of noise bypass lines 65 and 265a to 265f can be reduced.

Further, in the first and second embodiments, the outermost core sheets may have a thickness larger than that of the other core sheets. In this manner, the impedance of the noise path (B) can be decreased, and hence a larger amount of high-frequency conduction noise can be flowed through the noise path (B).

REFERENCE SIGNS LIST 30 power conversion circuit, 40 core sheet, 50, 250 motor (rotating electric machine), 52 stator, 53 core back portion, 54 tooth portion, 56 stator winding, 57 rotor, 65, 265a to 265f noise bypass line, 262 noise bypass line group.

The invention claimed is:

1. A rotating electric machine driven by a power conversion circuit, the rotating electric machine comprising:
a stator formed by stacking a plurality of core sheets, the stator including:
a core back portion having an annular shape; and
a plurality of tooth portions extending from an inner peripheral side of the core back portion toward a radially inner side; and
a noise bypass line having one end connected to the core back portion of an outermost core sheet included in the stator and another end grounded to a GND of the power conversion circuit,
wherein the noise bypass line includes a first noise bypass line and a second noise bypass line,
wherein the first noise bypass line has one end connected at one point to the core back portion of an outermost core sheet forming one side of the stator, and
wherein the second noise bypass line has one end connected at one point to the core back portion of an outermost core sheet forming another side of the stator.

2. The rotating electric machine according to claim 1, wherein the outermost core sheet forming the one side of the stator and the outermost core sheet forming the other side of the stator have a thickness larger than that of other core sheets.

3. A rotating electric machine driven by a power conversion circuit, the rotating electric machine comprising:
a stator formed by stacking a plurality of core sheets, the stator including:
a core back portion having an annular shape; and
a plurality of tooth portions extending from an inner peripheral side of the core back portion toward a radially inner side; and
a noise bypass line having one end connected to the core back portion of an outermost core sheet included in the stator and another end grounded to a GND of the power conversion circuit,
wherein the noise bypass line includes a first noise bypass line group and a second noise bypass line group,
wherein the first noise bypass line group has one end connected at a plurality of points to the core back portion of an outermost core sheet forming one side of the stator, and
wherein the second noise bypass line group has one end connected at a plurality of points to the core back portion of an outermost core sheet forming another side of the stator.

4. The rotating electric machine according to claim 3, wherein the outermost core sheet forming the one side of the stator and the outermost core sheet forming the other side of the stator have a thickness larger than that of other core sheets.

5. A rotating electric machine driven by a power conversion circuit, the rotating electric machine comprising:
a stator formed by stacking a plurality of core sheets, the stator including:
a core back portion having an annular shape; and
a plurality of tooth portions extending from an inner peripheral side of the core back portion toward a radially inner side; and
a noise bypass line having one end connected to the core back portion of an outermost core sheet included in the stator and another end grounded to a GND of the power conversion circuit,
wherein the noise bypass line includes a first noise bypass line, and
wherein the first noise bypass line has one end connected at one point to the core back portion of an outermost core sheet forming one side of the stator.

6. The rotating electric machine according to claim 5, wherein the outermost core sheet forming the one side of the stator has a thickness larger than that of other core sheets.

* * * * *